(12) United States Patent
Tanabiki et al.

(10) Patent No.: US 7,577,854 B2
(45) Date of Patent: Aug. 18, 2009

(54) INFORMATION STORAGE DEVICE HAVING A DIVIDED AREA IN MEMORY AREA

(75) Inventors: Masamoto Tanabiki, Yokohama (JP); Kazunori Inoue, Tokyo (JP); Hayashi Ito, Matsudo (JP)

(73) Assignee: Panasonic Corporation, Osaka (JP)

( * ) Notice: Subject to any disclaimer, the term of this patent is extended or adjusted under 35 U.S.C. 154(b) by 675 days.

(21) Appl. No.: 10/530,477

(22) PCT Filed: Aug. 6, 2004

(86) PCT No.: PCT/JP2004/011630

§ 371 (c)(1),
(2), (4) Date: Jun. 2, 2005

(87) PCT Pub. No.: WO2005/017757

PCT Pub. Date: Feb. 24, 2005

(65) Prior Publication Data

US 2005/0216651 A1 Sep. 29, 2005

(30) Foreign Application Priority Data

Aug. 7, 2003 (JP) .............................. 2003-288794

(51) Int. Cl.
*G06F 12/14* (2006.01)
(52) U.S. Cl. ..................... 713/193; 711/2; 711/129; 711/153
(58) Field of Classification Search ................. 713/193; 711/2, 129, 153
See application file for complete search history.

(56) References Cited

U.S. PATENT DOCUMENTS

| 4,211,919 | A | 7/1980 | Ugon | |
|---|---|---|---|---|
| 5,537,635 | A | * 7/1996 | Douglas | ..................... 711/129 |
| 6,606,707 | B1 | 8/2003 | Hirota et al. | |
| 6,792,541 | B1 | 9/2004 | Kusakabe et al. | |
| 2005/0138401 | A1 | 6/2005 | Terao et al. | |

FOREIGN PATENT DOCUMENTS

| EP | 0973136 A | 1/2000 |
|---|---|---|
| EP | 1050887 A | 11/2000 |
| EP | 1050887 A1 * | 11/2000 |
| JP | 7-93501 | 4/1995 |
| JP | 2001-014441 | 1/2001 |

* cited by examiner

*Primary Examiner*—Matthew B Smithers
*Assistant Examiner*—Ali S Abyaneh
(74) *Attorney, Agent, or Firm*—Greenblum & Bernstein, P.L.C.

(57) ABSTRACT

An information storage apparatus capable of setting the number and sizes of partitioned areas resulting from partitioning a memory area based on a user's intention is provided. For this purpose, an information storage apparatus having a plurality of partitioned areas of different security levels in a memory area is provided with an area control section that controls addresses of partitioned areas in the memory area, an area update condition control section that controls update conditions when the number or sizes of partitioned areas are updated, an area update decision section that decides whether a partition request requesting updating of the number or sizes of partitioned areas satisfies the update conditions and an area update section that executes, when the partition request satisfies the update conditions, updating of the partitioned areas in the memory area according to the partition request. The partitioned areas in the memory area of this information storage apparatus are updated at a partition request reflecting the user's intention in accordance with the user's intention.

5 Claims, 8 Drawing Sheets

FIG.4A

| TIMING | PRESENCE/ABSENCE OF AUTHENTICATION | NECESSITY OF ENCRYPTION |
|---|---|---|
| BEFORE ISSUANCE | EXTERNAL AUTHENTICATION WITH CARD ISSUER | NONE |
| AFTER ISSUANCE | EXTERNAL AUTHENTICATION WITH CARD ISSUER OWNER PASSWORD CHECK | YES |
| ... | ... | ... |

FIG.4B

| PARTITIONABLE COUNT | 3 TIMES |
|---|---|
| MAXIMUM NUMBER OF PARTITIONED AREAS | 3 |
| MAXIMUM SIZE PER AREA | △ BYTES |
| ... | ... |

| AREA IDENTIFIER | LOCATION | LOCATION WHERE ACTUAL DATA IS STORED |
|---|---|---|
| LEVEL 1 | ADDRESS a TO b | ADDRESS a TO a' |
| LEVEL 2 | ADDRESS c TO d | ADDRESS c TO c' |

FIG.5

| ITEM | CONTENTS |
|---|---|
| TIMING | AFTER ISSUANCE |
| OTHER PARTY OF AUTHENTICATION | CARD ISSUER |
| PRESENCE/ ABSENCE OF ENCRYPTION | NONE |
| PARTITION COUNT | 1 |
| SIZE OF AREA PARTITION THIS TIME | LEVEL 1 :a BYTES, LEVEL 2 :b BYTES |
| ... | ... |

FIG.7

INFORMATION STORAGE DEVICE HAVING A DIVIDED AREA IN MEMORY AREA

TECHNICAL FIELD

The present invention relates to an information storage apparatus provided with a memory area such as a semiconductor memory card and IC card.

BACKGROUND ART

In recent years, a semiconductor memory card provided with a plurality of areas having different security levels and access techniques on a single card is under development. For example, a conventional technology described in the Unexamined Japanese Patent Publication No. 2001-14441 discloses a semiconductor memory card having an authenticated area accessible to only authenticated devices and a non-authenticated area accessible without any authentication as a storage area.

As shown in FIG.1, this memory card incorporates an IC chip of a flash memory 303 making up a storage area and a control IC 302 that controls write/read to/from the storage area, and the flash memory 303 is provided with an authenticated area 332 that permits access only to devices authenticated as licensed devices and a non-authenticated area 331 that permits access without any such authentication.

Furthermore, the control IC 302 is provided with an authentication section 321 that authenticates the validity of another party device attempting to access this memory card 109, a command decision control section 322 that decides the type of a command input through a command pin and controls various components according to the type, an authenticated area access control section 325 that executes data write/read to/from the authenticated area 332 of the flash memory 303 and a non-authenticated area access control section 326 that executes data write/read to/from the non-authenticated area 331.

A terminal which accesses the authenticated area 332 of this memory card 109 performs authentication with the authentication section 321 of the memory card 109 and when the authentication is completed successfully, the terminal is allowed to perform data write/read to/from the authenticated area 332 through the authenticated area access control section 325. Furthermore, data write/read to/from the non-authenticated area 331 can be freely performed through the non-authenticated area access control section 326.

The non-authenticated area 331 and authenticated area 332 of this memory card 109 are delimited at a certain address in the flash memory 303 as a boundary and the size of each area can be made variable by changing the boundary address. When the area is changed, an apparatus accessing the memory card 109 performs authentication with the memory card 109 and then sends the size of the non-authenticated area 331 to the memory card 109 using an area change dedicated command. Upon reception of the area change command, the memory card 109 saves the value in a non-volatile work area in the memory card 109 and executes access control over the authenticated area 332 and non-authenticated area 331 using the value as a new boundary address in subsequent accesses.

However, in such a conventional information storage apparatus having a plurality of partitioned areas, a memory area is already partitioned based on the intention of a card issuer at a stage at which the card is issued to a user. Thus, even when the mode of use of the information storage apparatus differs from one user to another, each user cannot help but acquire an information storage apparatus having only a preplanned partitioned area.

DISCLOSURE OF INVENTION

It is an object of the present invention to provide an information storage apparatus allowing a user to set the number and sizes of partitioned areas resulting from partition of a memory area based on the user's intention.

This object is attained by an information storage apparatus including a plurality of partitioned areas with different security levels in a memory area, provided with an area control section that controls addresses of the partitioned areas in the memory area, an area update condition control section that controls update conditions when updating the number or sizes of the partitioned areas, an area update decision section that decides whether a partition request requesting updating of the number or sizes of partitioned areas satisfies the update conditions or not and an area update section that updates, when the partition request satisfies the update conditions, the partitioned areas in the memory area according to the partition request.

BRIEF DESCRIPTION OF DRAWINGS

FIG. 4A illustrates procedure conditions that specify a procedure under area update conditions of the secure memory card;

FIG. 4B illustrates entity conditions that specify an area update entity under area update conditions of the secure memory card;

FIG. 5 illustrates area control information on the secure memory card according to an embodiment;

FIG. 7 illustrates information stored by the area update decision section of the secure memory card according to the embodiment.

BEST MODE FOR CARRYING OUT THE INVENTION

With reference now to the attached drawings, an embodiment of the present invention will be explained below.

Embodiment 1

An embodiment of the present invention will explain an information storage apparatus having three areas of an authenticated area, non-authenticated area and secure area as areas whose size is set based on a user's intention.

Figure 1:
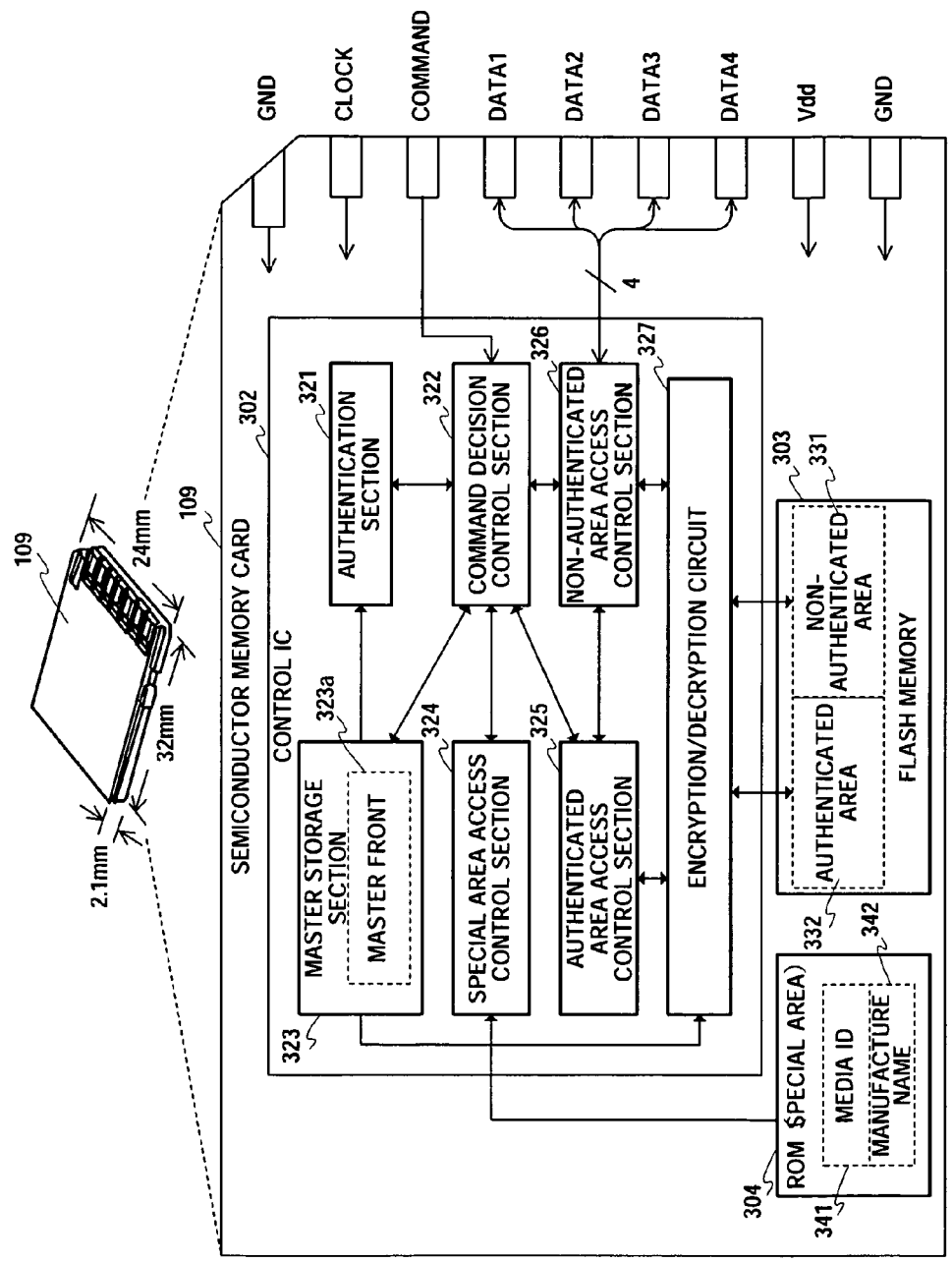
FIG. 1 is a block diagram showing the configuration of a conventional semiconductor memory card.
Figure 2:
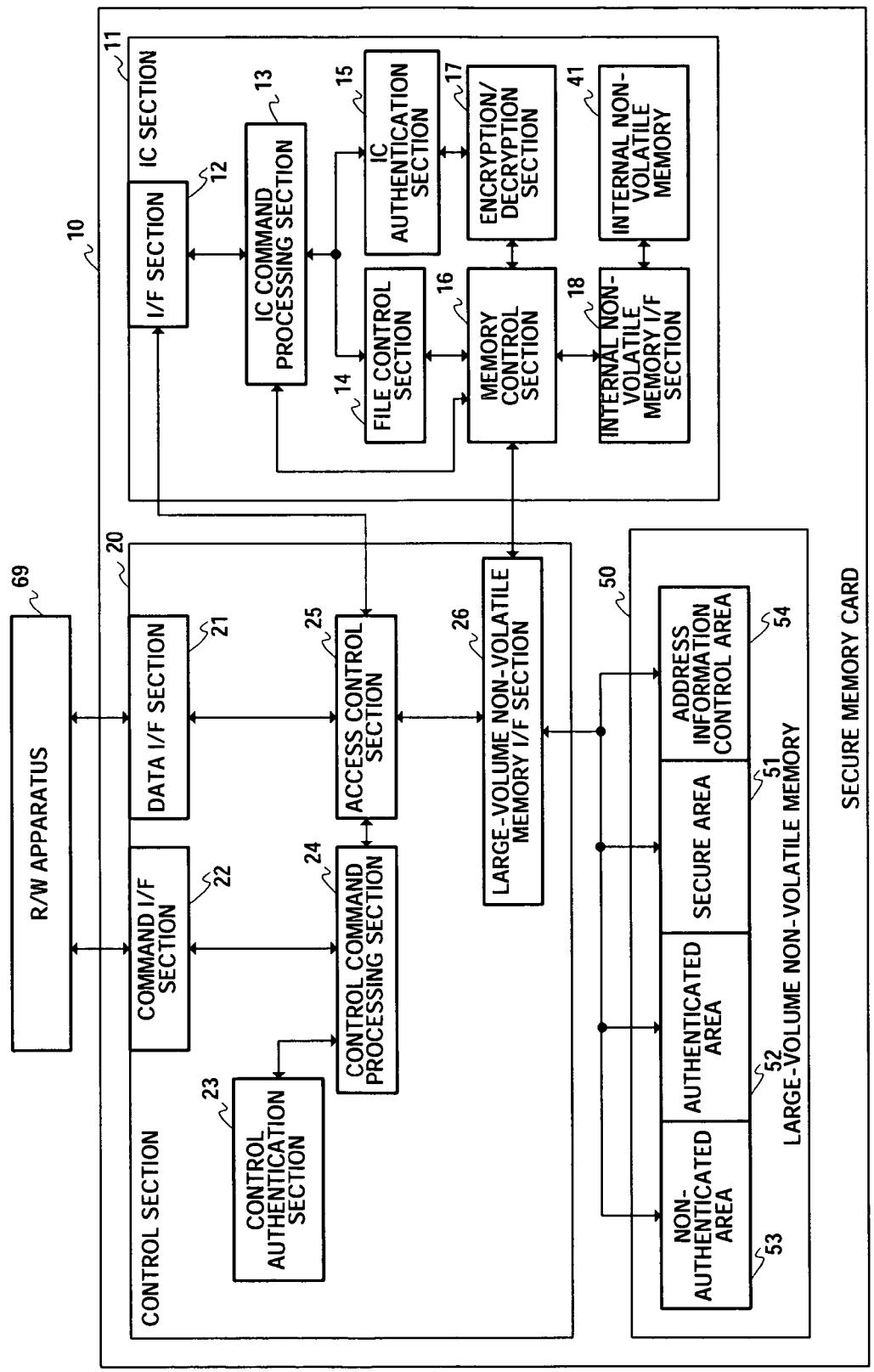
FIG. 2 is a block diagram showing the configuration of a secure memory card.

The information storage apparatus having the authenticated area, non-authenticated area and secure area (here referred to as "secure memory card") is the card developed by the present applicant recently and as shown in the block diagram of FIG. 2, the information storage apparatus is roughly provided with a control section 20, a large-volume non-volatile memory 50 made up of a flash memory and a tamper resistant IC section 11.

The large-volume non-volatile memory 50 includes an authenticated area 52 accessible to only authenticated devices, a non-authenticated area 53 accessible without any authentication, a secure area 51 accessible only to the IC section 11 and an address information control area 54 that stores address information on these areas.

The control section 20 is provided with a data I/F section 21 that exchanges data with an R/W apparatus 69, a command I/F section 22 that exchanges commands with the R/W apparatus 69, a control authentication section 23 that authenticates the R/W apparatus 69, a control command processing section 24 that interprets an accepted command and performs processing according to the command, an access control section 25 that controls access to the large-volume non-volatile memory 50 and serves as means for exchanging data with the IC section 11 and a large-volume non-volatile memory I/F section 26 that exchanges data with the large-volume non-volatile memory 50.

On the other hand, the IC section 11 is provided with an internal non-volatile memory 41, an I/F section 12 that exchanges data and command with the control section 20, an IC command processing section 13 that interprets a command and carries out processing according to the command, a file control section 14 that controls data stored in the internal non-volatile memory 41 and secure area 51 in a file format, an IC authentication section 15 that authenticates the R/W apparatus 69 and permits the authenticated R/W apparatus 69 data access to the internal non-volatile memory 41 and secure area 51, an encryption/decryption circuit 17 that performs encryption/decryption on write/read data to/from the internal non-volatile memory 41 and secure area 51 using a key stored in the internal non-volatile memory 41, a memory control section 16 that controls the internal non-volatile memory 41 and secure area 51 and an internal non-volatile memory I/F section 18 that exchanges data with the internal non-volatile memory 41.

The R/W apparatus 69 that performs data write/read to/from the non-authenticated area 53 of this secure memory card 10 sends a command to request access to the non-authenticated area 53 to the secure memory card 10. The control command processing section 24 interprets the command, instructs the access control section 25 to perform access control over the large-volume non-volatile memory 50, and the data sent from the R/W apparatus 69 through the data I/F section 21 is written into the non-authenticated area 53 and the data read from the non-authenticated area 53 is sent to the R/W apparatus 69 through the data I/F section 21.

Furthermore, the R/W apparatus 69 that performs data write/read to/from the authenticated area 52 sends a command to request authentication, performs authentication with the control authentication section 23 and then sends a command to request access to the authenticated area 52. The control command processing section 24 interprets the command, instructs, when the authentication has been completed successfully, the access control section 25 to perform access control over the large-volume non-volatile memory 50, and the data sent from the R/W apparatus 69 through the data I/F section 21 is written into the authenticated area 52 and the data read from the authenticated area 52 is sent to the R/W apparatus 69 through the data I/F section 21.

Furthermore, a command of the R/W apparatus 69 to request data write/read to/from the secure area 51 is transferred from the access control section 25 to the IC section 11 under the instruction of the control command processing section 24 that has interpreted the command. The IC command processing section 13 of the IC section 11 interprets this command and causes, when the command is requesting authentication, the IC authentication section 15 to perform authentication processing on the R/W apparatus 69 and confirms, when the command is requesting data write/read to/from the secure area 51, that the authentication processing on the IC authentication section 15 has been finished and then instructs the memory control section 16 to perform data write/read to/from the secure area 51. The memory control section 16 that has received the instruction requests the encryption/decryption circuit 17 to encrypt the data sent from the R/W apparatus 69 to the IC section 11 through the access control section 25 and writes the encrypted data into the secure area 51 of the large-volume non-volatile memory 50 through the large-volume non-volatile memory I/F section 26. Furthermore, the data read from the secure area 51 is decoded by the encryption/decryption circuit 17 and sent to the IC command processing section 13. This data is sent from the data I/F section 21 of the control section 20 to the R/W apparatus 69.

Thus, in this secure memory card 10, the authenticated area 52 has a higher security level than the non-authenticated area 53 and the secure area 51 has a higher security level than the authenticated area 52. The secure area 51 is suitable as the place to store highly confidential application or high-volume data handled by the application installed in an IC card, while the authenticated area 52 is suitable as the place to store contents whose copyright is protected. Furthermore, general data that requires no confidentiality or encrypted data which has no possibility of being decoded can be stored in the non-authenticated area 53. For this reason, the user who tries to store more highly confidential application wants the secure area 51 to be wider, while the user who tries to store more contents whose copyright is protected prefers the wider authenticated area 52 and the user who only stores general data which need not be kept in confidentiality wants the non-authenticated area 53 to be expanded.

Figure 3:
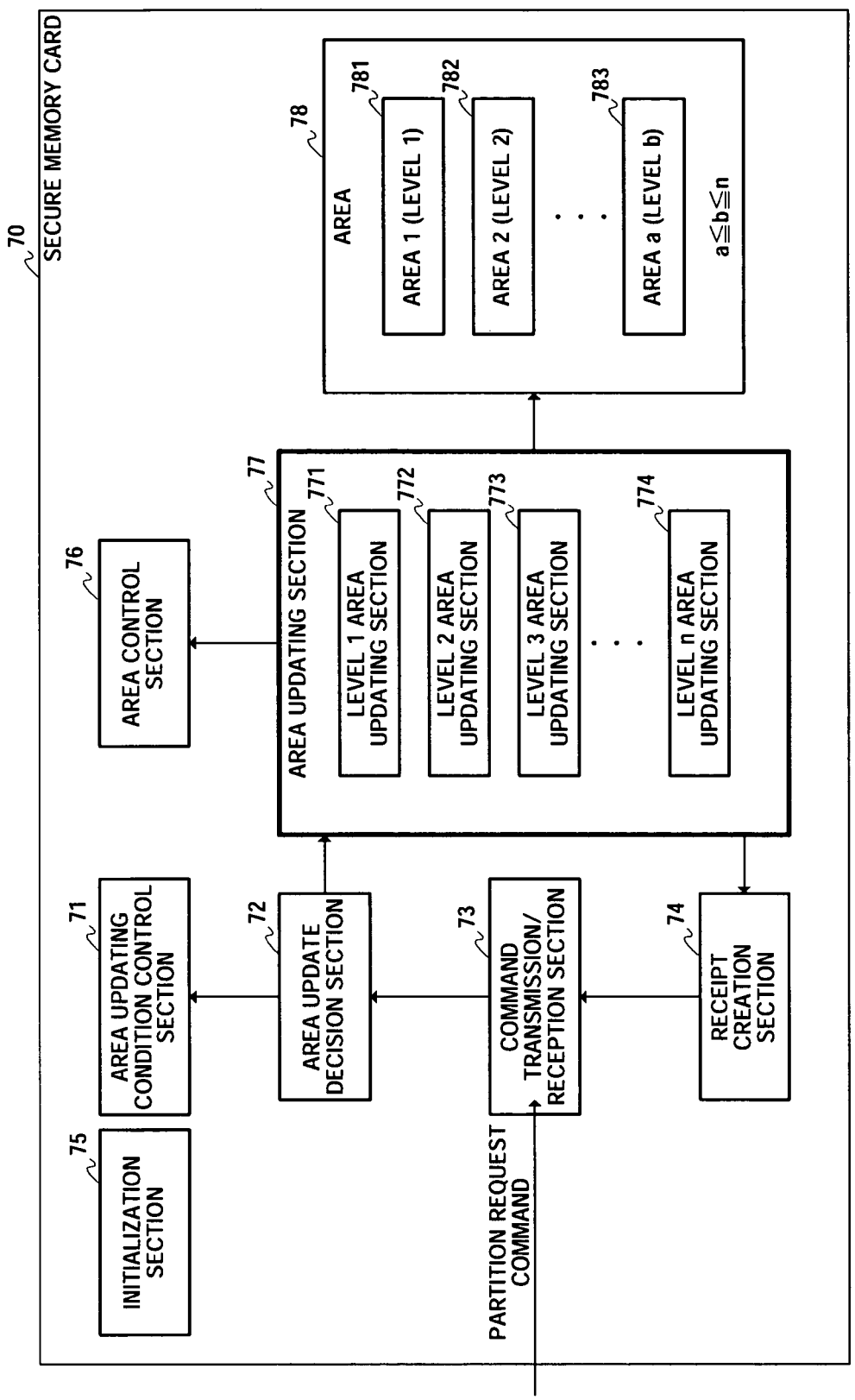
FIG. 3 illustrates a block diagram showing the configuration of the secure memory card.

To allow the user to set the sizes of the authenticated area, non-authenticated area and secure area of the secure memory card based on this user's intention, as shown in FIG. 3, the secure memory card of this embodiment of the present invention is provided with a command transmission/reception section 73 that receives a partition request command to request repartition of the memory area 78 from the outside and transmits the processing result to the outside, an area update condition control section 71 that controls update conditions of the memory area 78, an area update decision section 72 that decides whether a partition request of the memory area 78 meets the area update conditions under the control of the area update condition control section 71 or not, an area update section 77 that reformats the memory area 78 when the area partition request satisfies the area update conditions, an area control section 76 that controls addresses, etc., of the memory area 78, an initialization section 75 that performs initial partition of the memory area 78 and stores initial value data in the partitioned areas and a receipt creation section 74 that creates a receipt indicating that the repartition of the memory area 78 has been normally conducted based on the partition request.

Furthermore, the area update section 77 is also provided with area update sections 771 to 774 that set memory partitioned areas at their respective security levels and memory partitioned areas of different security levels which are set in the memory area 78 by some of those area update sections are expressed here as area 1 (781) to area a (783).

The memory area 78 of this secure memory card 70 corresponds to the large-volume non-volatile memory 50 in FIG. 2 and the area 1 (781) to area a (783) correspond to the non-authenticated area 53, authenticated area 52, secure area 51, etc., in FIG. 2. Furthermore, the area control section 76 is the section that controls the address information control area 54 of the large-volume non-volatile memory 50 in FIG. 2 and including this area control section 76, the command transmission/reception section 73, area update condition control section 71, area update decision section 72, area update section 77, initialization section 75 and receipt creation section 74 are provided in the control section 20 in FIG. 2.

As shown in FIG. 4A and FIG. 4B, the area update condition control section 71 controls a table specifying the area update conditions. The area update conditions are made up of procedure conditions (FIG. 4A) that specify a procedure and entity conditions (FIG. 4B) that specify an entity of area updating. The procedure conditions specify the necessity of authentication and the necessity of command encryption in association with the timing of performing area partition, while the entity conditions specify a partitionable count, a maximum number of partitions of the memory area 78 and maximum size per memory partitioned area, etc. Here, these procedure conditions and entity conditions can be determined for various reasons by a card issuer, service operator, etc., and there can be naturally cases where the procedure conditions may not be distinguished before and after issuance of a card.

In the memory area 78 of the secure memory card 70 at the stage of shipment, the initialization section 75 sets the non-authenticated area, authenticated area and secure area of predetermined sizes and the initialization section 75 writes initial data in the respective memory partitioned areas.

The area control section 76 controls address information on the memory partitioned area in this memory area 78. FIG. 5 illustrates area control information controlled by the area control section 76. Here, area identifiers indicating security levels of the memory partitioned area, address values indicating the positions of the memory partitioned areas in the memory area 78 and address values indicating the range in which actual data is stored in the memory partitioned area are controlled.

When a user purchases this secure memory card 70 at a shop, the secure memory card 70 is set in an R/W apparatus at the shop and the user sets a memory partitioned area of a desired size in the memory area 78 through the operation of the R/W apparatus.

Figure 6:
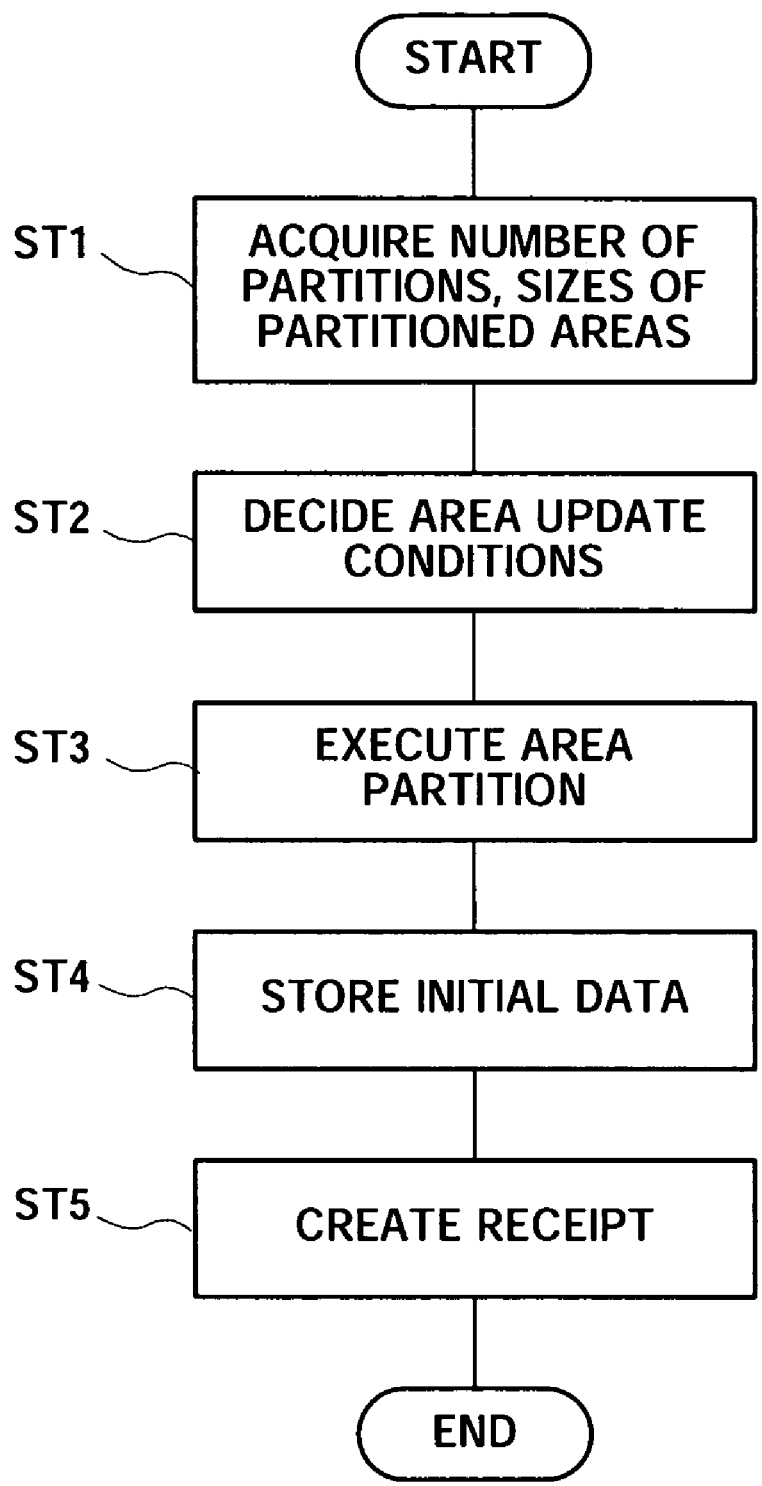
FIG. 6 illustrates a flow chart showing the operation of the secure memory card according to the embodiment.

The flow chart in FIG. 6 shows a procedure in the secure memory card 70 in which area partition takes place. Prior to this processing, the R/W apparatus and secure memory card 70 execute mutual authentication and execute external authentication with the card issuer specified under the procedure conditions (FIG. 4A) of the area update conditions.

In the card, status transition in the card (referred to as "life cycle" in the card terminology) is generally under control and the moment the user password is set, the life cycle becomes an "issued mode". At the current stage at which no user password is set, the life cycle is "pre-issuance mode", and therefore the processing specified under the "pre-issuance" procedure conditions is executed.

Furthermore, it is also possible to control the reception situation of a partition processing request with a flag in the card and determine the processing with reference to this flag. In this case, "A (pre-issuance mode)" is set as a flag initial value, and when the first partition processing request is received, processing is performed in the A mode and when this processing is completed, the flag value is set to a "B (post-issuance mode)" and subsequent partition processing requests are processed in the B mode. The flag at the current stage is "A (pre-issuance mode)" of the initial value and the processing specified under the "pre-issuance" procedure conditions is executed.

When the command transmission/reception section 73 receives a partition request command including information such as the number and sizes of memory partitioned areas and attributes, etc., from the R/W apparatus, the area update decision section 72 acquires the information such as the number and sizes of the memory partitioned areas and attributes, etc., (step 1) and decides whether the partition request satisfies the entity conditions (FIG. 4B) of the area update conditions controlled by the area update condition control section 71 or not (step 2).

When the partition request satisfies the area update conditions, as shown in FIG. 7, the area update decision section 72 records the item related to the partition request, stores permanently or temporarily, transmits the information of "size of area to be partitioned this time" to the area update section 77 and requests the area update section 77 to update the memory area 78. The area update section 77 finds an unused area in which no actual data is stored from the area control information of the memory area 78 controlled by the area control section 76, reformats this unused area and sets a memory partitioned area of the requested size using the area update sections 771 to 774 at the corresponding security levels (step 3).

The initialization section 75 stores necessary initial data (or updated data) in the updated memory partitioned area (step 4). Accompanying this processing, the area control section 76 updates the area control information to be controlled.

The receipt creation section 74 creates a receipt including identification information of the secure memory card 70, information on the size of the updated memory partitioned area or difference size of the memory partitioned area before and after updating (step 5). This receipt is output from the command transmission/reception section 73 to the R/W apparatus and displayed on a screen, etc., of the R/W apparatus.

This secure memory card 70 is issued to the user after the user's password is written.

Figure 8:
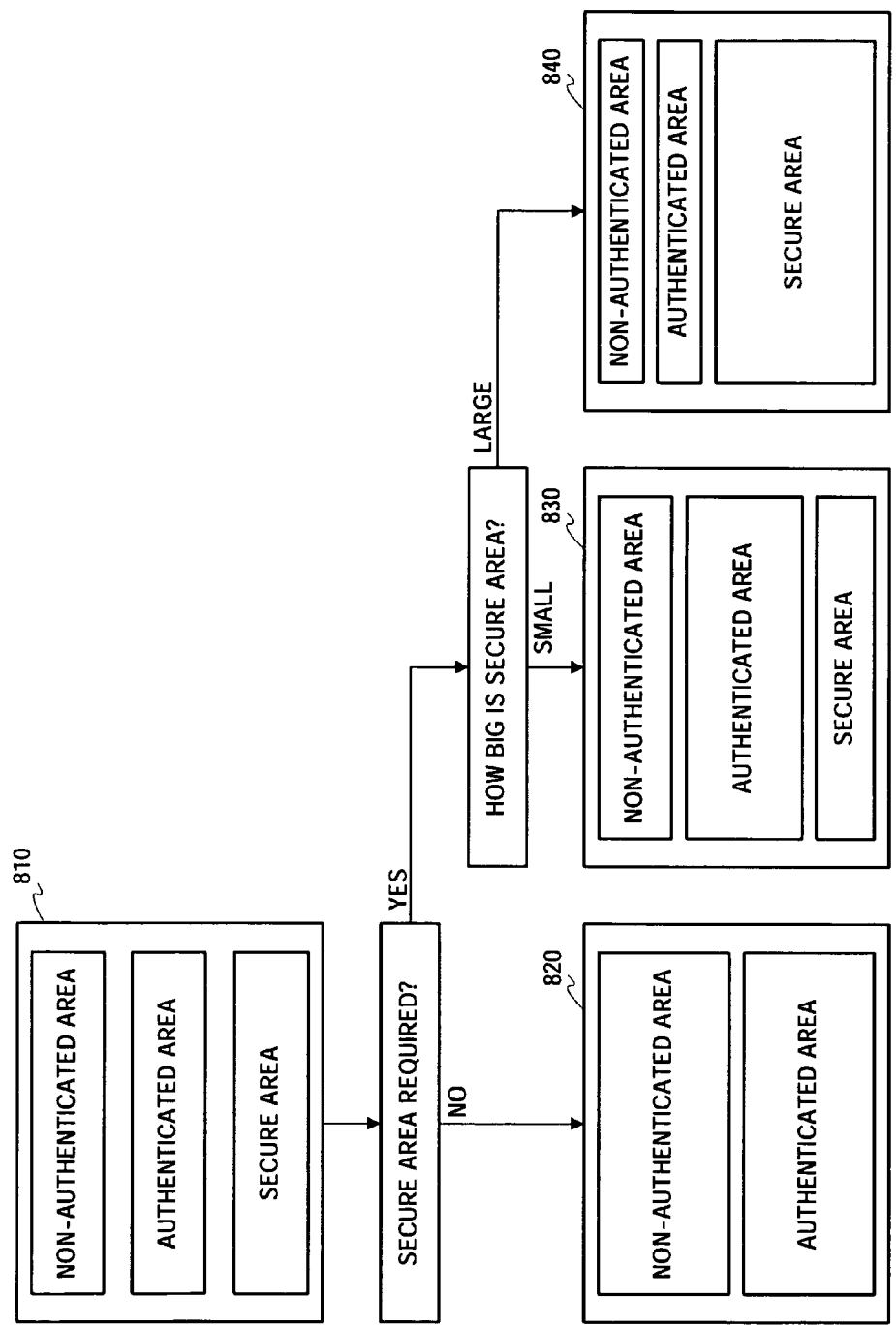
FIG. 8 schematically illustrates a memory partitioned area before and after updating.

FIG. 8 schematically illustrates the memory partitioned area before and after updating. More specifically, in FIG. 8, reference numeral 810 schematically denotes the memory partitioned area before updating, 820 denotes the updated memory partitioned area reformatted according to the user's intention and the updated memory partitioned area (when the secure area is not necessary), 830 denotes the updated memory partitioned area (when the secure area is small) and 840 denotes the updated memory partitioned area (when the secure area is large).

Thus, when this secure memory card is issued to the user, it is possible to divide the memory area thereof based on the user's intention. For this reason, the user can acquire an original card, not an established one at a shop. On the other hand, in order to respond to the customer's request, a card maker need not prepare various types of models with different numbers and sizes of partitioned areas. Therefore, it is possible to avoid excessive stock of specific models.

Here, the case where the secure memory card is inserted in the R/W apparatus and this R/W apparatus is operated to output a partition request command of the memory area to the secure memory card has been explained, but it is also possible to store information on several patterns of area partition in the secure memory card and select an area partition pattern to be implemented in the secure memory card using the R/W apparatus.

Furthermore, the user who is using an issued card can also get the memory area of the secure memory card reformatted when the memory partitioned area needs to be changed.

In this case, the secure memory card brought by the user is inserted into the R/W apparatus at the shop and the memory area is reformatted. The R/W apparatus and secure memory card execute mutual authentication, performs external authentication with the card issuer specified under the procedure conditions (FIG. 4A) of the area update conditions and check the owner against the password. Next, the processing in FIG. 6 is carried out in the secure memory card and the unused area in which no actual data is stored is reformatted.

Or in this case, it is also possible to save the data stored in the memory area before being reformatted in the R/W apparatus once, reformat the memory area according to a partition request and then write back the saved data into the updated memory partitioned area.

Thus, it is possible to reformat the memory partitioned area of the issued secure memory card, and therefore when tastes and preferences, and trends in the society change, the user can just reformat the secure memory card without buying a new one. On the other hand, the card maker has an opportunity to contact users of issued cards and take this opportunity to expand services for the users.

Furthermore, this secure memory card can be constructed so that the area partition of the memory area is effective through registration of the user's password. In this case, the secure memory card is provided with an output section (receipt creation section 74) that outputs information on the updating of the memory partitioned area carried out by the area update section and a reception section that receives user confirmation registration in response to the information and the secure memory card is constructed so that the update of said partitioned are as becomes effective when the confirmation registration is accepted. The user transmits a request for area partition of the secure memory card to the card maker beforehand, confirms the area partition through the receipt created by the receipt creation section 74 when the user receives the secure memory card formatted according to this request at a shop, etc., and has the password registered in the secure memory card. This registration allows the secure memory card to be used.

Such an operation is quite useful when cards to which are a partition of a special specification is applied are ordered in large quantity and advance notification of an area partition request allows the user to receive the card without waiting at a store, etc. Furthermore, it is also possible to distribute secure memory cards without registered passwords through channels such as mail order and allow a user who acquires the secure memory card to have a password registered from a terminal and make the card available.

The R/W apparatus which updates the memory partitioned area of the card may be a dedicated fixed terminal at a shop or may also be other portable terminal (cellular phone or PDA, etc.). Furthermore, the card whose memory partitioned area is updated may be attached to a portable terminal in a detachable manner or may also be the form of a chip embedded in a portable terminal, etc.

The information storage apparatus described above maintains update conditions for partitioned areas for partitioning a memory area and updates, when a partition request satisfies the update conditions, the partitioned area according to the request, and can be issued with setting a partitioned area of the user's intention in the memory area, and also reset the memory area of the information recording apparatus after issuance so as to meet the user's intention. As a result, the partitioned area in the memory area is updated at the partition request that reflects the user's intention.

Furthermore, since procedure conditions related to an update procedure and entity conditions related to update contents are specified as update conditions, if a partition request satisfies the procedure conditions and entity conditions, the memory area is partitioned according to the user's intention based on the partition request when the user accepts issuance by the information storage apparatus and the memory area of the information storage apparatus used after reception of the issuance is repartitioned based on the partition request.

Furthermore, any one of at least an updatable count, maximum number of partitioned areas and maximum size of the partitioned area is specified as the entity conditions, and therefore it is possible to update the partitioned area when the update count is within the count specified under the entity conditions or when the number or sizes of partitioned areas are within a specified range, the partitioned area can be updated.

Furthermore, since the area update section repartitions an unused area in which no actual data in the memory area is recorded according to the partition request, even when the partitioned area is updated, the already recorded actual data is saved.

Furthermore, since a receipt creation section for creating a receipt indicating that the partitioned area has been updated successfully is provided and this receipt describes the size of the updated partitioned area or the difference in size of the partitioned area before and after updating, it is possible to know the update result of the partitioned area by checking this receipt.

Furthermore, the output section that outputs information on the updating of the partitioned area in the memory area carried out by the area update section and the reception section that receives the user confirmation registration for the information are provided and the update of said partitioned areas becomes effective when the confirmation registration is accepted.

Owing to this scheme, for example, the user can transmit a partition request of the information storage apparatus to the card maker, and receive a password from the card or give a password to the card maker in advance. When the user receives the information storage apparatus whose area has been partitioned according to this request at a shop, the user input a password to the information storage apparatus and make the information storage apparatus available.

This application is based on the Japanese Patent Application No. 2003-288794 filed on Aug. 7, 2003, entire content of which is expressly incorporated by reference herein.

INDUSTRIAL APPLICABILITY

The present invention is applicable to a semiconductor memory card, IC card, secure memory card, various kinds of information recording apparatus called "secure device", etc., and can reflect a user's intention in formats of memory areas in these information storage apparatuses.

What is claimed is:

1. An information storage apparatus to which devices write and from which devices read, the information storage apparatus comprising:

an information controller that, using a key held inside, encrypts and writes data in a memory area, and decodes and reads the encrypted data in said memory area, said memory area including a plurality of partitioned areas, wherein each of said partitioned areas is one of a non-authenticated area accessible without any authentication, an authenticated area accessible only to authenticated devices, and a secure area accessible only to said information controller; and a partition controller that controls reading from and writing to said partitioned areas in said memory area, said partition controller comprising:

an area controller that controls addresses of said partitioned areas in said memory area;

an area update condition controller that controls update conditions when updating the number and sizes of said partitioned areas;

an area update decider that receives, from a user, a partition request that requests updating of the number and sizes of said partitioned areas and that decides whether said partition request satisfies said update conditions; and an area updater that updates, when said partition request satisfies said update conditions, the number and sizes of said partitioned areas in said memory area according to said partition request, wherein procedure conditions that specify necessity of authentication in association with a timing of updating said partitioned areas, and entity conditions that specify conditions including the number of times said memory area can be partitioned, a maximum number of partitioned areas, and a maximum size per partitioned area are specified as said update conditions, wherein said timing of updating said partitioned areas is one of before issuance of the information storage apparatus from a card issuer to the user and after issuance of the information storage apparatus from the card issuer to the user, and wherein said area update decider receives said partition request from the user after issuance of the information storage apparatus from the card issuer to the user.

2. The information storage apparatus according to claim 1, wherein said area updater repartitions an unused area where no actual data in said memory area is recorded according to said partition request.

3. The information storage apparatus according to claim 1, further comprising a receipt creator that creates a receipt indicating that said partitioned area has been updated successfully.

4. The information storage apparatus according to claim 3, wherein said receipt further indicates the size of said updated partitioned area and a difference in size of said partitioned area before and after updating.

5. The information storage apparatus according to claim 1, further comprising:

an outputter that outputs information on updating of partitioned areas in said memory area carried out by said area updater; and a receiver that receives user confirmation registration in response to said information, wherein the update of said partitioned areas becomes effective when the confirmation registration is accepted.

* * * * *